United States Patent
Kanemitsu et al.

[11] Patent Number: 6,139,457
[45] Date of Patent: Oct. 31, 2000

[54] SHEET METAL PULLEY

[75] Inventors: Toshiaki Kanemitsu, Kobe; Kazuyuki Oda, Hyogo, both of Japan

[73] Assignee: Kabushiki Kaisha Kanemitsu, Hyogo, Japan

[21] Appl. No.: 08/530,282

[22] PCT Filed: Mar. 3, 1994

[86] PCT No.: PCT/JP94/00347

§ 371 Date: Oct. 11, 1995

§ 102(e) Date: Oct. 11, 1995

[87] PCT Pub. No.: WO95/23932

PCT Pub. Date: Sep. 8, 1995

[51] Int. Cl.[7] .............................. F16H 55/49; F16H 55/50
[52] U.S. Cl. ........................ 474/170; 474/168; 242/614; 29/892
[58] Field of Search .............................. 474/94, 166, 167, 474/168, 170; 242/155 R, 614, 614.1; 29/892, 892.2, 892.3; D8/360

[56] References Cited

U.S. PATENT DOCUMENTS

| | | | |
|---|---|---|---|
| 4,468,210 | 8/1984 | McCutchan, Jr. | 474/170 |
| 4,767,387 | 8/1988 | Matsuoka et al. | 474/168 |
| 5,123,166 | 6/1992 | Kanemitsu et al. | 29/892.3 |

FOREIGN PATENT DOCUMENTS

| | | |
|---|---|---|
| 47-37971 | 11/1972 | Japan . |
| 51-148551 | 11/1976 | Japan . |
| 54-51255 | 4/1979 | Japan . |
| 55-47047 | 4/1980 | Japan . |
| 64-11330 | 1/1989 | Japan . |

Primary Examiner—Eileen D. Lillis
Assistant Examiner—Gary S. Hartmann
Attorney, Agent, or Firm—Jones, Tullar & Cooper, P.C.

[57] ABSTRACT

A sheet metal pulley has a base part and a cylindrical peripheral wall for winding a belt formed integrally with the base part. An ear is disposed in an end part of the cylindrical peripheral wall. The base part is partitioned into an inner peripheral portion and an outer peripheral portion, with the inner peripheral portion being smoothly connected with the outer peripheral portion through a bent part. The outer peripheral portion is formed into a tapered shape which extends from the bent part and has a diameter which is increased toward the inner side of the cylindrical peripheral wall in the axial direction of the pulley. The outer peripheral portion connected with an end part of the peripheral wall on the side of the ear. Even when the pulley is used for a long term, the connecting portion between the peripheral wall and the base part, etc. is hardly cracked.

4 Claims, 4 Drawing Sheets

SHEET METAL PULLEY

TECHNICAL FIELD

The present invention relates to a sheet metal pulley, and particularly to a sheet metal pulley having an annular ear which projects outward from an end part of a cylindrical peripheral wall for winding a belt.

BACKGROUND ART

FIGS. 3 and 5 show a prior art sheet metal pulley A in which a circular base part and a peripheral wall for winding a belt are integrally formed by working, or the like, a flat sheet metal blank.

The sheet metal pulley A of FIG. 3 has a recess part 11 for accommodating a bearing (not shown), in an inner peripheral portion of a circular base part 1. A cylindrical peripheral wall 2 having poly-V grooves 21 and an ear 22 is integrally formed in the outer peripheral end of the base part 1. The base part 1 has a flat annular part 12 surrounding the recess part 11. The ear 22 has a double layer structure consisting of a first inclined part 23 which extends from the annular part 12 on the side of the base part 1, and a second inclined part 24 which is folded toward one face of the first inclined part 23 so as to overlap with the first inclined part.

In the sheet metal pulley A of FIG. 5, an ear 22 is formed so as to have a single layer structure, and the end part of the peripheral wall 2 on the side of the ear 22 is integrally connected with the base part 1.

In the sheet metal pulley A of FIG. 3, when a poly-V belt (not shown) is wound around the peripheral wall 2 and the pulley A is then operated, a crack a which is directed from the inner side to the outer side may be formed in a relatively short period in a folded portion 25 in the vicinity of the boundary of the first inclined part 23 and the second inclined part 24 as shown in FIG. 4. Also in the sheet metal pulley A of FIG. 5, a crack a which is directed from the inner side to the outer side may be formed in a relatively short period in a connecting portion 26 between the end part of the peripheral wall 2 on the side of the ear 22 and the base part 1.

The formation of the crack a and its cause in the sheet metal pulley A has intensively been investigated. As a result, it is found that, when the pulley is operated, the peripheral wall 2 around which a belt is wound, vibrates or oscillates about the folded portion 25 or the connecting portion 26 functioning as the fulcrum, with the result that the folded portion 25 or the connecting portion 26 is excessively fatigued.

The present invention is a result of studying the above-mentioned circumstances. It is, therefore, an object of the present invention to provide a sheet metal pulley in which a crack is hardly formed, by improving the structure of a base part connected with an end part of a peripheral wall so that, even when the peripheral wall vibrates or oscillates as the pulley is operated, fatigue is prevented from excessively occurring in one position.

SUMMARY OF THE INVENTION

In order to attain the noted object, a sheet metal pulley according to the present invention has a base part and a cylindrical peripheral wall for winding a belt integrally formed with it and has an annular ear projecting outward from an end part of the peripheral wall. The pulley is configured so that the base part is partitioned into an inner peripheral portion and an outer peripheral portion, the inner peripheral portion being connected with the outer peripheral portion through a bent part, and the outer peripheral portion being formed into a tapered shape which extends from the bent part. The diameter of the outer peripheral portion is increased toward the inner side in the axial direction of the pulley, and is connected with the end part of the peripheral wall on the side of the ear.

In another embodiment of a sheet metal pulley according to the present invention, in addition to the above-mentioned configuration, a recess part into which a bearing is to be fitted is disposed in the inner peripheral portion of the base part.

In the sheet metal pulley described above, when a belt is wound around the pulley and the pulley is operated (at high rpm), vibration and oscillation of the peripheral wall are sufficiently propagated to the outer peripheral portion so that vibration and oscillation effectively occur also in the outer peripheral portion. In this case, the fulcrums of the vibration and oscillation are scattered in the end part of the peripheral wall on the side of the ear and also in the bent part, and hence the bending fatigue due to the vibration and oscillation is not concentrated into the end part of the peripheral wall. Therefore, cracking in the end part of the peripheral wall on the side of the ear is prevented for a long term.

In order to effectively prevent the crack formation from occurring, the taper angle of the outer peripheral portion may be set to be in the range of 15° to 70° or preferably 25 to 50 with respect to a horizontal axis perpendicularly intersecting with the axial direction of the pulley.

In the case where a recess part is disposed in the inner peripheral portion of the base part, a bearing is fitted into the recess part to be attached to the pulley.

DESCRIPTION OF THE PREFERRED EMBODIMENTS

Figure 1:
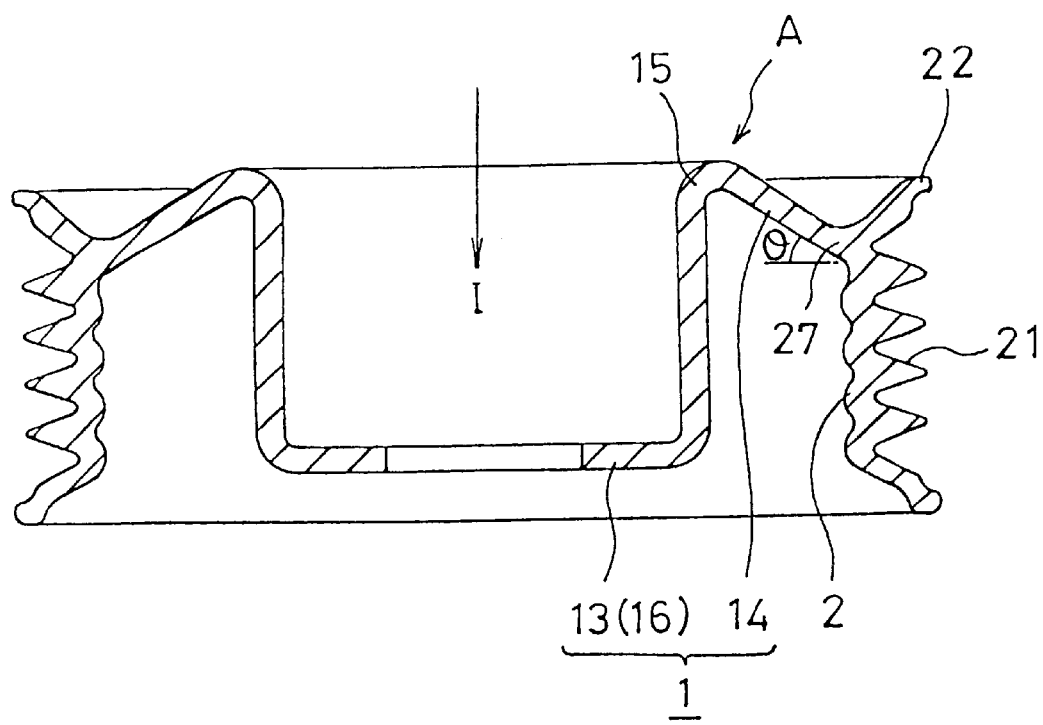
FIG. 1 is a vertical section view of a sheet metal pulley according to a first embodiment of the present invention.

In a sheet metal pulley A according to a first embodiment of the present invention and shown in FIG. 1, a base part 1 is partitioned into an inner peripheral portion 13 and an outer peripheral portion 14. The inner peripheral portion 13 is smoothly connected with the outer peripheral portion 14 through a bent part 15, and the outer peripheral portion 14 is formed into a tapered shape which extends from the bent part 15. The diameter of the outer peripheral portion 14 is increased toward the inner side in the axial direction of the pulley (the I direction indicated by the arrow in FIG. 1), and connected with an end part 27 of a peripheral wall 2 on the side of an ear 22. The whole of the inner peripheral portion 13 is formed as a recess part 16 which projects into a space surrounded by the outer peripheral portion 14. The recess part 16 is structured so that a bearing, which is not shown, is fitted into the recess part to be accommodated therein. The peripheral wall 2 has poly-V grooves 21 and the ear 22. The end part 27 on the side where the ear 22 is formed is integrally connected with the outer peripheral portion 14 of the base part 1.

In the sheet metal pulley A of the embodiment, when a poly-V belt is wound around the peripheral wall 2 and the pulley is operated, vibration and oscillation of the peripheral wall 2, which are caused by the operation, are sufficiently propagated to the outer peripheral portion 14 so that vibration and oscillation effectively occur also in the outer peripheral portion 14. In this case, the fulcrums of the vibration and oscillation are scattered in the end part 27 of the peripheral wall 2 on the side of the ear 22 and also in the bent part 15, and hence the bending fatigue due to the vibration and oscillation is not concentrated into the part where the end part 27 of the peripheral wall 2 on the side of the ear 22 intersects with the outer peripheral portion 14. Consequently, cracking in the intersection part is prevented for a long term.

In order to effectively prevent the crack formation from occurring, the taper angle θ of the outer peripheral portion 14 may be set to be in the range of 15° to 70° or preferably 25° to 50° with respect to a horizontal axis perpendicularly intersecting with the axial direction of the pulley (the I direction indicated by the arrow in FIG. 1).

Figure 2:
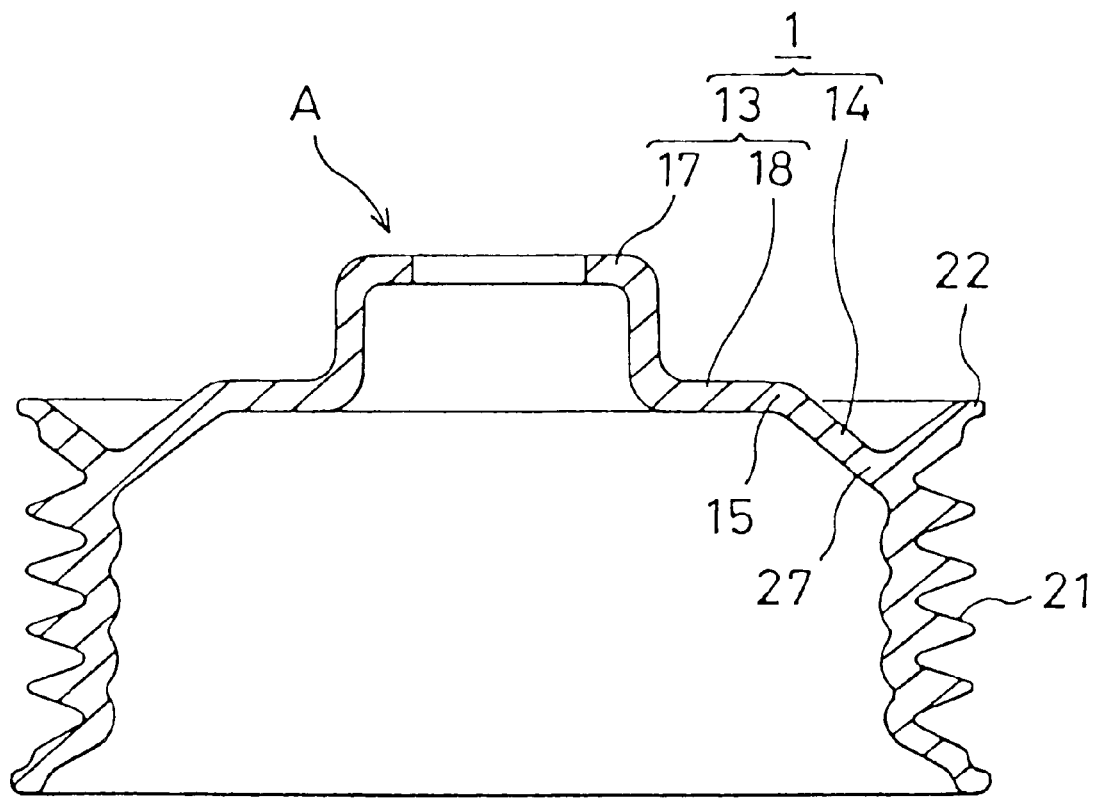
FIG. 2 is a vertical section view of a sheet metal pulley according to a second embodiment of the present invention.
Figure 3:
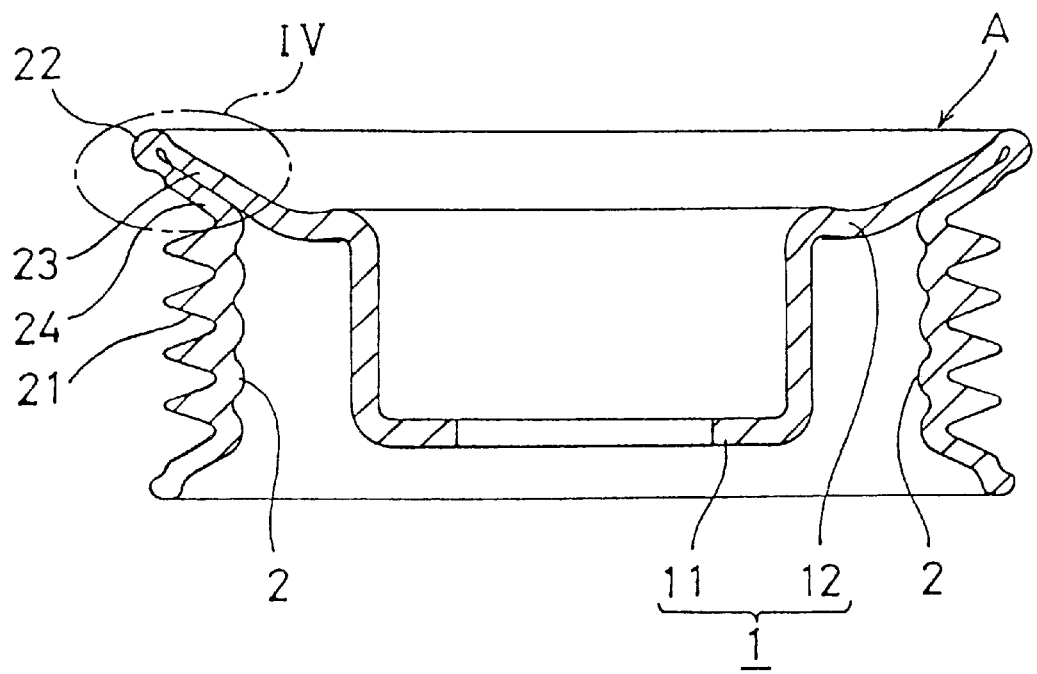
FIG. 3 is a vertical section view of a prior art sheet metal pulley.

FIG. 2 shows a sheet metal pulley A of a second embodiment of the present invention. In the sheet metal pulley A, the base part 1 is partitioned into the inner peripheral portion 13 and the outer peripheral portion 14, and the inner peripheral portion 13 is smoothly connected with the outer peripheral portion 14 through the bent part 15, the peripheral wall 2 has the poly-V grooves 21 and the ear 22, and the end part 27 of the peripheral wall on the side where the ear 22 is formed is integrally connected with the outer peripheral portion 14 of the base part 1. These are the same as those of the first embodiment described with reference to FIG. 1.

The embodiment is different from the first embodiment in that the inner peripheral portion 13 of the base part 1 has a center projection 17, and in that a flat annular part 18 surrounding the projection. The annular part 18 is connected with the outer peripheral portion 14 through the bent part 15.

Also in the sheet metal pulley A of the second embodiment, when a poly-V belt is wound around the peripheral wall 2 and the pulley is operated, vibration and oscillation of the peripheral wall 2, which are caused by the operation, are sufficiently propagated to the outer peripheral portion 14 so that the fulcrums of the vibration and oscillation are scattered also in the bent part 15. Therefore, the situation in which one position, i.e., the intersection part of the end part 27 of the peripheral wall 2 on the side of the ear 22 and the outer peripheral portion 14 of the base part 1 is excessively fatigued and a crack formed, is prevented from occurring.

Figure 4:
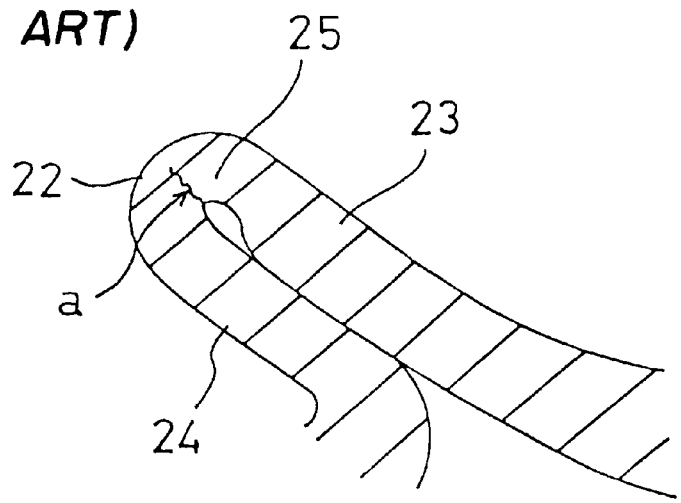
FIG. 4 is an enlarged section view of the section IV of FIG. 3.
Figure 5:
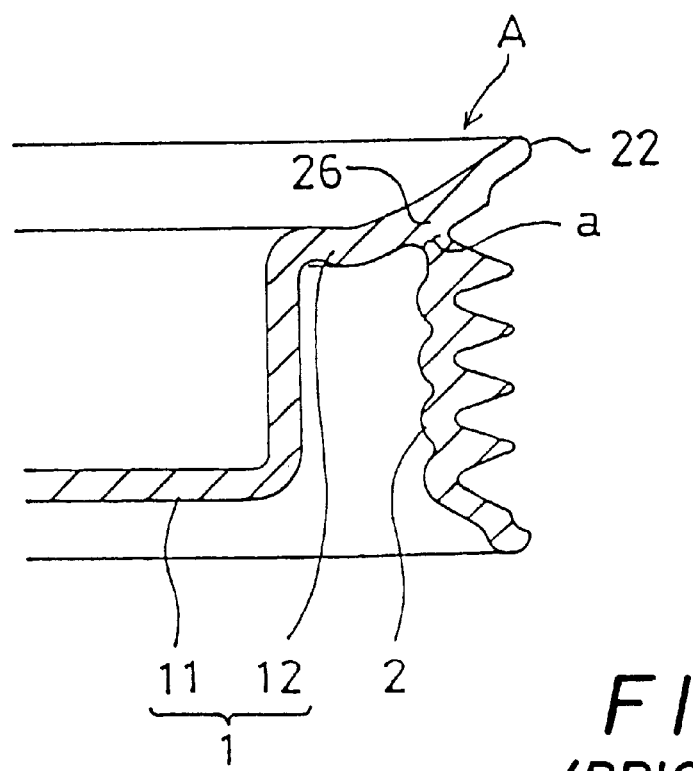
FIG. 5 is a vertical section view of another prior art sheet metal pulley.

In the embodiments described above, the sheet metal pulley A has the ear 22 of the single layer structure. It is a matter of course that the present invention can be applied also to the sheet metal pulley A such as shown in FIG. 4 and having the ear of the double layer structure. In the embodiment shown in FIG. 1, the apex of the bent part 15 is slightly higher in level than the end part of the ear 22. It is a matter of course that, in order to prevent the bent part 15 from projecting outward in the axial direction, the level of the end part of the ear 22 may be set so as to coincide with that of the apex of the bent part 15 or the level of the apex of the bent part 15 may be set so as to be slightly lower than that of the end part of the ear 22. Furthermore, the lower face of the bottom wall of the recess part 16 of the inner peripheral portion 13 may be made to coincide with the level of the lower end part of the peripheral wall 2 to the extent that the recess part does not protrude from the lower end part of the peripheral wall 2 toward the outer side in the axial direction.

The sheet metal pulley of the present invention has a structure in which the connecting portion between the base part and the peripheral wall, and the ear hardly crack. Therefore, the present invention attains the effect that the endurance life of the pulley can be prolonged as compared with a prior art pulley.

The present invention may be applied to a pulley of the type in which a flat belt is to be wound around the peripheral wall, and also to that of the type in which the peripheral wall has a single V-groove so that a V-belt is to be wound around the peripheral wall.

What is claimed is:

1. A sheet metal pulley, comprising: a base part which defines an axial direction; and a cylindrical peripheral wall integrally formed therewith, said cylindrical peripheral wall having an inner side, an end part and an annular ear projecting outward from said end part, wherein said base part includes an inner peripheral portion, a bent part and an outer peripheral portion, said inner peripheral portion being connected with said outer peripheral portion by said bent part, wherein said outer peripheral portion is formed into a tapered shape which extends from said bent part, and wherein the diameter of said outer peripheral portion is increased toward said inner side in said axial direction, with said outer peripheral portion being connected to said end part of said cylindrical peripheral wall on the side thereof from which said annular ear projects.

2. A sheet metal pulley according to claim 1, wherein said outer peripheral portion forms a taper angle which is in the range of 15° to 70° with respect to a horizontal axis perpendicularly intersecting said axial direction.

3. A sheet metal pulley according to claim 1, wherein said outer peripheral portion forms a taper angle which is in the range of 25° to 50° with respect to a horizontal axis perpendicularly intersecting said axial direction.

4. A sheet metal pulley according to claim 1, wherein said inner peripheral portion defines a recess part into which a bearing is to be fitted.

* * * * *